March 13, 1934.　　　C. NORLAND　　　1,950,512
LAWN SPRINKLER
Filed Dec. 1, 1931
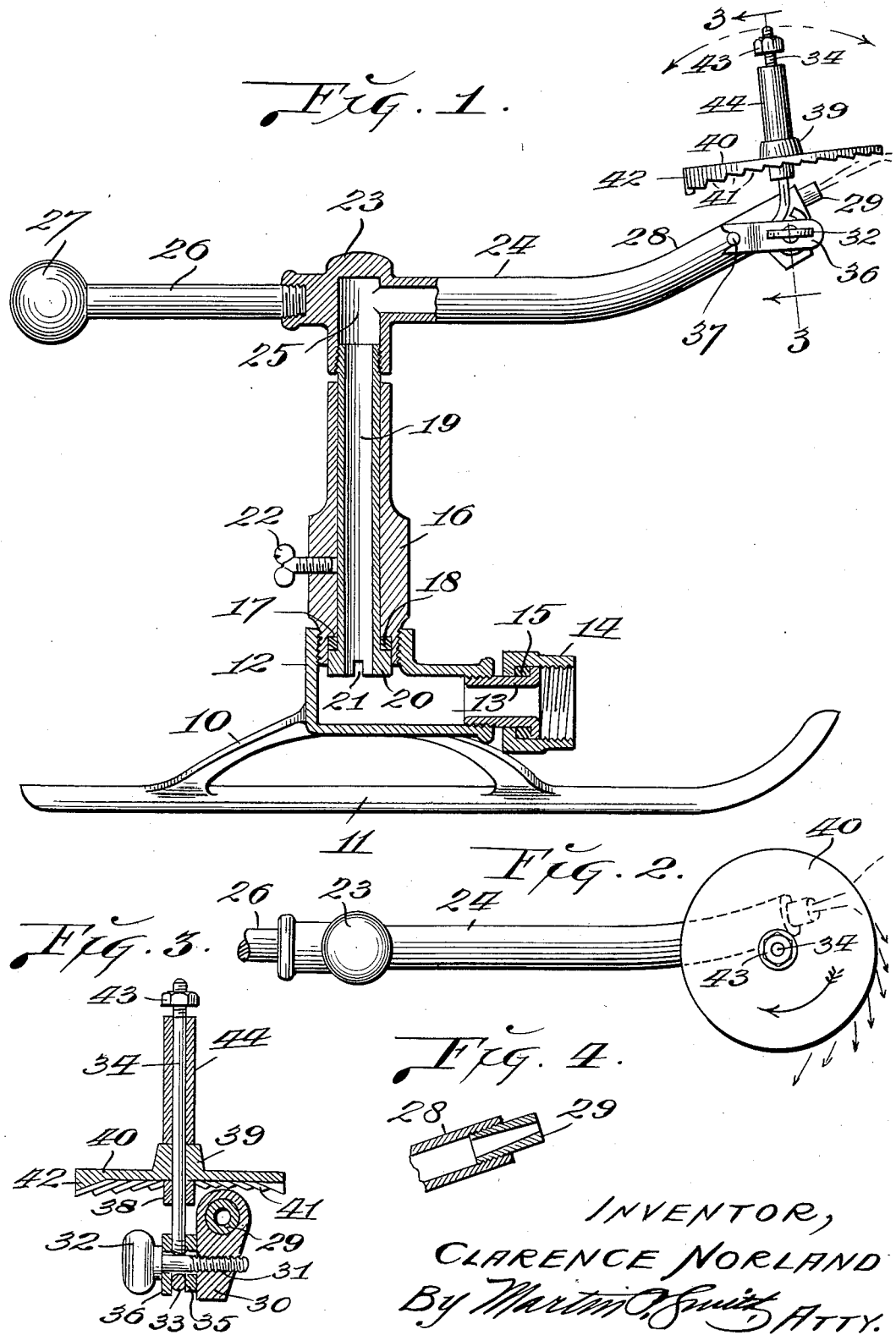
INVENTOR,
CLARENCE NORLAND Patented Mar. 13, 1934

1,950,512

UNITED STATES PATENT OFFICE 1,950,512

LAWN SPRINKLER

Clarence Norland, Cypress, Calif.

Application December 1, 1931, Serial No. 578,232

2 Claims. (Cl. 299—69)

My invention relates to a lawn sprinkler and has for its principal object, the provision of a relatively simple, practical and inexpensive sprinkling device that may be conveniently used for the distribution of water on lawns, golf courses, gardens and orchards.

Further objects of my invention are, to provide a lawn sprinkler having a revolving jet nozzle that is designed to throw a jet of water a considerable distance away from the sprinkler and further, to mount on the jet nozzle an adjustable member including a disc that is engaged by the jet of water discharging from the nozzle, which disc is effective in distributing a portion of the water that discharges from the jet nozzle throughout a considerable area of the lawn or ground surface immediately adjacent to the sprinkler and the operation of which rotary disc is effective in imparting rotary motion to the jet nozzle.

A further object of my invention is, to provide a sprinkler of the character referred to having relatively simple and efficient means for clamping the revolving nozzle so as to hold the same against rotation so that the jet of water issuing from said nozzle will be continuously directed upon a predetermined portion of the lawn or ground surface adjacent to the sprinkler.

With the foregoing and other objects in view, my invention consists in certain novel features of construction and arrangement of parts that will hereinafter be more fully described and claimed and illustrated in the accompanying drawing in which:

Fig. 1 is a vertical section taken through the center of a lawn sprinkler constructed in accordance with my invention.

Fig. 2 is a top plan view of the revolving nozzle.

Fig. 3 is a vertical cross section taken on the line 3—3 of Fig. 1.

Fig. 4 is a detail section showing a removable nipple that is located in the end of the jet nozzle.

Referring by numerals to the accompanying drawing which illustrates a practical embodiment of my invention, 10 designates a skeleton base that is preferably formed of metal and which includes a pair of rails 11 that are shaped similar to the runners of a sled in order that the frame which carries the sprinkler may be readily drawn over the surface of the ground.

Formed integral with or fixed to the central portion of the frame is a substantially L-shaped housing 12 and screw-seated in the outer end of the horizontal portion of this housing is a nipple 13, on the outer end of which is swiveled a hose coupling member 14 and there being a packing ring 15 arranged between said coupling member and nipple.

Screw-seated in the upper end of the vertical leg of the housing 12, the lower portion of a short vertically disposed tube 16 and the bore through this tubular member is countersunk at its lower end to provide a chamber 17, in the upper portion of which is seated a packing ring 18 of leather, rubber or analogous material.

Passing lengthwise through tubular member 16 and arranged for rotation therein, is a tube 19, provided on its lower end with a head 20, that occupies the lower portion of the chamber 17 in the lower end of of member 16 and when the sprinkler is in operation, the upper surface of this head bears against the undersurface of packing ring 18.

Formed in the lower portion of head 20 is a diametrically arranged slot 21 that is adapted to receive the point of a screw-driver or like tool.

Screw-seated in tubular member 16 is a set screw 22, which when screwed inwardly, bears against the surface of tube 19 and clamps the same so as to hold it against rotary motion.

The upper portion of tube 19 projects a short distance above tubular member 16 and screw-seated on the projecting upper end of said tube 19 is a short cylindrical block 23 and projecting outwardly from the upper portion thereof is a horizontally disposed tube 24. The duct through this tube 24 communicates with a chamber 25 that is formed in cylindrical member 23 and this chamber also communicates with the chamber in housing 12 through tube 19.

Secured to cylindrical member 23 diametrically opposite and in longitudinal alignment with tube 24 is a horizontally disposed arm 26 carrying at its outer end a weight 27, which functions to counterbalance tubular arm 24 and the parts carried thereby while the sprinkler is in operation.

The outer portion 28 of tube 24 is bent upwardly so as to occupy an inclined plane of approximately 15 or 20 degrees relative to a horizontal plane and this upwardly bent end portion is also bent laterally so as to occupy an inclined position of approximately 10 or 12 degrees relative to the vertical plane occupied by the axes of the straight portion of tube 24 and rod 26.

Screw-seated in the outer end of the inclined end portion 28 of the tubular member 24 is a short tubular nipple 29 that functions as a jet nozzle and a number of these nipples having jet openings of different sizes may be supplied with each sprinkler, thereby enabling the nipples to be interchangeably used so as to discharge jets of water of different sizes.

Formed integral with and depending from the outer end of the inclined members 28 is a lug 30, through which is formed a horizontally disposed threaded aperture 31 and seated therein is the threaded shank of a set screw 32.

Encircling the shank of this set screw, is the looped lower end 33 of an upwardly projecting rod 34 and interposed between the looped lower end of this rod and the lug 30 is a lock washer 35.

Arranged between the loop 33 and the head of set screw 32, is one end of a tension plate 36 that projects rearwardly from the end of the nozzle a short distance and the rear end of this plate is bifurcated for engagement with a lug or stud 37, that projects from the side of inclined member 28. When set screw 32 is tightened the looped lower end 33 of rod 34 is very firmly clamped between lock washer 35 and tension plate 36 and thus said rod is maintained in its adjusted position.

Secured to rod 34 a short distance above the looped lower end thereof is a collar 38 and mounted to rotate freely upon rod 34 just above this collar is the hub 39 of a disc 40, preferably formed of metal.

The undersurface of this disc adjacent to its edge, is notched or serrated as designated by 41 and for a short distance on one side of the disc this notched underface is increased in thickness so as to form a weight 42.

The upper end of rod 34 is threaded and receives a nut 43 and arranged on said rod between the hub 39 of disc 40 and said nut 43, is a rotatably mounted spacing sleeve 44 that is preferably formed of hard rubber or bakelite.

This spacing sleeve 44 functions as a handle that may be readily used when rod 34 and disc 40 are adjusted backwardly or forwardly upon the set screw 32, which latter provides an axis for the swinging movement of said rod and disc.

In the use of my improved sprinkler a hose is connected to coupling 14 and when the water is turned on through said hose said water would pass through housing 12, thence upwardly through tube 19, thence through tubular arm 24 and said water will discharge in jet form through nipple 29.

Arm 34 is adjusted upon set screw 32 and secured in its adjusted position by tightening said set screw and as a result of such adjustment the jet of water issuing from the nozzle will strike against the notched under surface of the disc 40 and owing to the lateral inclination of the portion 28 of the tubular arm, the point of impingement between the jet of water and the disc will be to one side of a line drawn diametrically across the disc 40, with the result that said disc will be rotated at high speed.

A considerable portion of the jet of water that strikes against the relatively thin or unweighted portion of the rotating disc will pass directly outward and fall on the ground a substantial distance away from the sprinkler while the water that strikes against the notched underface of the weighted portion of the disc will be carried around and thrown off at varying angles and tangents, as shown by arrows in Fig. 2, and this water will cover the ground for a considerable distance immediately adjacent to the sprinkler.

Inasmuch as the jet of water strikes against the underside of the disc to one side of the vertical plane occupied by the axis of said disc and the axis of rotation of arm 24, a certain amount of reactive force is developed, which will cause said arm 24 and parts carried thereby to slowly rotate upon its axis, which is the tube 19, which is mounted for rotation in tubular member 16.

The vibration resulting from the impingement of the jet of water against the inclined faces of the notches or serrations 41 on the underface of disc 40, is sufficient to overcome the friction between tube 19 and the tubular member 16 so that arm 24 and parts carried thereby will be caused to slowly rotate, with the result that the water that issues from the sprinkler will be distributed over a considerable area of the ground or lawn adjacent to the sprinkler.

Rod 34 upon which disc 40 is mounted for rotation may be adjusted outwardly or inwardly, as illustrated by dotted lines in Fig. 1 so as to vary the point of impingement of the jet of water against the under surface of said disc and thereby vary the speed of rotation of the arm 24 and likewise to vary the distance or area covered by the water that is distributed by the sprinkler. After adjustment the rod 34 may be securely clamped in adjusted position by tightening set screw 32.

By tightening set screw 22 so as to clamp tube 19, arm 24 may be held against rotation so that the jet of water issuing from the sprinkler may be directed so as to cover a predetermined area.

Thus it will be seen that I have provided a lawn sprinkler that is relatively simple in construction, inexpensive of manufacture and very effective in performing the functions for which it is intended.

It will be understood that minor changes in the size, form and construction of the various parts of my improved water sprinkler may be made and substituted for those herein shown and described without departing from the spirit of my invention, the scope of which is set forth in the appended claims.

I claim as my invention:

1. In a water sprinkler, the combination with a jet nozzle mounted to revolve on a vertical axis, an upstanding rod pivotally connected to the discharge end of said nozzle and adapted to swing through an arc toward and away from the axis of said nozzle, means for clamping said rod to said nozzle in differently adjusted angular positions with respect to the line of travel of the jet of water issuing from said nozzle, a disc mounted for rotation on said rod and positioned above the discharge end of said nozzle, a weight arranged on the underside of said disc adjacent to the edge thereof, which weight decreases in thickness for the edge of the disc toward the center thereof and the underface of said disc adjacent to its edge and the underface of said weight being provided with notches.

2. In a water sprinkler, the combination with a jet nozzle mounted to revolve on a vertical axis, of a disc adjustably mounted on said jet nozzle and disposed in a plane above the discharge end of said nozzle, a weight on the underside of said disc adjacent to the edge thereof, which weight decreases in thickness from the edge of the disc toward the center thereof, the underface of the disc adjacent to its edge being provided with notches and the underface of said weight being provided with notches.

CLARENCE NORLAND.